United States Patent Office 3,663,705
Patented May 16, 1972

3,663,705
ANIMAL GROWTH PROMOTERS
Richard N. Hurd, Terre Haute, Ind., assignor to Commercial Solvents Corporation, New York, N.Y.
No Drawing. Filed Apr. 6, 1970, Ser. No. 26,123
Int. Cl. A61k 27/00
U.S. Cl. 424—281                                  20 Claims

ABSTRACT OF THE DISCLOSURE

An animal feed, especially for meat-producing animals such as swine, ruminants, poultry, etc., which contains an amount of 3-(p-loweralkoxyphenyl) or 3-(p-hydroxyphenyl) or 3-(p-benzyloxyphenyl)-4-n-propyl-7-hydroxycoumarin effective to promote the rate of growth, e.g., weight gain, and feed conversion of the animal being fed.

---

This invention relates to feed supplements for animals and their administration, and more particularly to novel animal feeds including feed compositions for swine, ruminants, e.g., cattle, sheep, and lamb, and poultry, which compositions contain an amount of 3-(p-loweralkoxyphenyl) or 3-(hydroxyphenyl) or 3-(p-benzyloxyphenyl)-4-n-propyl-7-hydroxycoumarin effective to promote the rate of growth of the animal being fed.

According to the present invention, a small amount of 3-(p-loweralkoxyphenyl) or 3-(p-hydroxyphenyl) or 3-(p-benzyloxyphenyl)-4-n-propyl - 7 - hydroxycoumarin, see general formula below, is added to animal feed rations such as lamb and poultry rations to provide improved animal growth, e.g. rate of weight gain, and better feed efficiency. The inclusion in conventional animal diets and feeds, e.g. meat-producing animal feeds such as ruminant feeds, swine feeds and poultry feeds has a particularly stimulating effect on growth and rate of weight gain. The coumarins are particularly employed with altered males and female animals, especially the latter. The coumarins employed in the compositions of this invention have the structural formula:

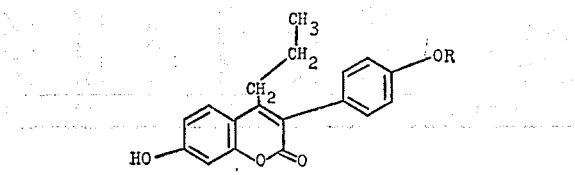

wherein R is hydrogen, lower alkyl or benzyl. When R is —CH₃ the compound is designated "Formula 1" and is also known as 3 - (p - methoxyphenyl)-4-n-propyl-7-hydroxycoumarin.

The coumarins can be administered to animals by any suitable method including oral and parenteral administrations. For example, they can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of coumarin fed to an animal, of course, varies depending upon the animal, desired rate of growth and the like.

When the coumarin is to be administered in feeds, an animal feed composition can be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitamin A and D mixtures; riboflavin supplements and other vitamin B complex members; and bone meal and limestone to provide minerals.

The coumarin compounds employed in this invention can be mixed with the feed by any conventional means. This can be done advantageously by grinding such a compound with some of the grain, such as, for instance, corn, or with other components of conventional animal feed such as vitamins, soybean meal, choline chloride, limestone flour, granite flour, oyster shell flour, fish flour, or the like, to provide a concentrated feed supplement composition containing the compound in any convenient amount. Generally, the concentrate will contain from about one percent, or more, e.g. about 5 to 50% by weight of the compound. The ground mixture can then be further mixed in a proper proportion with the feed.

It will be understood that the feed supplement in the nature of a concentrate consisting of such a compound and a solid or liquid carrier can be sold to the trade for incorporation in feeds. When so used, the compound will be present in the feed supplement concentrate in sufficient quantity to give the desired ratio of the compound to feed in the final composition fed to animals. The carrier present in the feed supplements of this invention may or may not have nutritional value. As illustrative of the solid carriers which can be employed in the novel feed supplements, there can be named soybean meal, choline chloride, vitamins (i.e. riboflavin, niacin, vitamin $B_{12}$, vitamin D), cottonseed meal, corn, mineral mixtures, walnut shells, diatomaceous earth, and the like. Illustrative of liquid carriers are water, molasses, vegetable oils, animal fats, nontoxic solutions containing urea, phosphates and other nutrients. These named carriers along with any others known in the feed industry to be employed in feed supplements can be used in the compositions of this invention.

The amount of the coumarin compound added to the animal diet and the period of administration will depend upon the attendant circumstances and the nature of the effect desired as well as the animal to be treated. The level of the compound in the feed generally should not be less than about 0.0001%, preferably about 0.0005%, nor greater than about 0.02, preferably about 0.01%, based on the weight of the animal's feed. The compound will normally be administered to the animal during the period in which it is being raised to increase its weight to that desired. For example, with chickens the period of administration will vary depending upon whether broilers or fryers as desired. The period will range from day-old chicks to chickens of the desired weight, this being for broilers about two and a half to three pounds dressed, rather than to a specific age, but normally the chickens are about 9 to 12, or 16, or more, weeks in age. For larger meat producing animals such as lambs, cattle and swine, the compound can be used with the initial baby animal feeds and throughout the growing and weight gain period of the animal, e.g. until slaughter. The period of administration can vary with such larger animals from a few months, i.e., 1 to 6 months up to several years, i.e., 1 to 3 years, depending upon the desired age and weight of the animal. Expressed in another way, the amount of active compound within the scope of this invention provided in the animal's feed will ordinarily be within the range from about 1 to 150 grams, preferably about 4 or 5 to 100 grams, of the compound per ton of animal feed over the desired period of administration. A particular amount for chickens is about 25 to 100 grams per ton of feed.

In order that the invention may be better understood, the following illustrative examples are given. Those skilled in the art will appreciate that other compositions according to this invention can be prepared and applied in accordance with the examples.

EXAMPLE I

Day-old Cornish Cross broiler chicks are allocated to five replicates of ten birds each sex and fed basal ration ad-libitum throughout the test. At ten days of age, these are allocated to proper batteries according to sex. The compound 3 - (p-methoxyphenyl)-4-n-propyl-7-hydroxy-coumarin at 1 mg., 3 mg., 6 mg., 9 mg., and 12 mg. in paste implant form is injected subcutaneously in the dorso-cervical region of the birds. This procedure is repeated at ten-day intervals for a period of thirty days. Each bird in the control batteries receives ¼ cc. placebo paste implant material on the same dates as the test birds. All birds are individually weighed and feed consumption measured at 10-day intervals in addition to each bird being individually wing-banded on the first injection date. At the conclusion of the test, necropsies are performed where indicated and final weights and feed consumption measured.

The weights and feed conversion at 10 days, 20 days, and 30 days (final) following the first implant for five such replicates are summarized in Tables I, II, and III. A response in weight gain and feed conversion, particularly with the female chicks, shows in the twenty and thirty day results. The ration fed the chicks was of the following composition:

| | Lb. |
|---|---|
| Ground yellow corn | 1000 |
| Soybean meal, 44% | 700 |
| Fish meal, 60% | 100 |
| Alfalfa meal | 50 |
| Animal fat | 80 |
| Dicalcium phosphate | 35 |
| Limestone | 15 |
| Iodized salt | 10 |

| | Gm. |
|---|---|
| Trace mineral mix—CCC | 454 |
| Choline supplement, 25% | 2000 |
| DL methionine | 908 |
| Proferm 24 | 227 |
| Manganese sulfate | 167 |
| Vitamin A (30,000 IU/gm.) | 200 |
| Vitamin $D_3$ (200,000 IU/gm.) | 12 |
| Santoquin | 113 |
| BY-24 | 120 |
| Niacin, 98% | 40 |
| Calcium pantothenate | 36 |
| Vitamin K (menadione), 32% | 4 |
| Vitamin E (myvamix) | 113 |
| Zinc oxide | 45 |
| Zoamix | 454 |

TABLE I

[Average weights and feed conversion, ten-day—post injection]

| | Control | 1 mg. | 3 mg. | 6 mg. | 9 mg. | 12 mg. |
|---|---|---|---|---|---|---|
| Male—weights | | | | | | |
| Rep. 1 | 382 | 332 | 385 | 396 | 392 | 398 |
| Rep. 2 | 383 | 382 | 396 | 373 | 394 | 390 |
| Rep. 3 | 380 | 402 | 386 | 389 | 379 | 383 |
| Rep. 4 | 396 | 358 | 379 | 386 | 408 | 385 |
| Rep. 5 | 392 | 389 | 386 | 386 | 393 | 368 |
| Average | 387 | 373 | 386 | 368 | 393 | 385 |
| Male—feed conversion | | | | | | |
| Rep. 1 | 1.62 | 1.66 | 1.56 | 1.57 | 1.39 | 1.53 |
| Rep. 2 | 1.50 | 1.53 | 1.53 | 1.50 | 1.59 | 1.51 |
| Rep. 3 | 1.54 | 1.52 | 1.55 | 1.62 | 1.53 | 1.50 |
| Rep. 4 | 1.52 | 1.54 | 1.53 | 1.53 | 1.52 | 1.52 |
| Rep. 5 | 1.48 | 1.52 | 1.50 | 1.53 | 1.45 | 1.48 |
| Average | 1.53 | 1.55 | 1.53 | 1.55 | 1.50 | 1.51 |
| Female—weights | | | | | | |
| Rep. 1 | 361 | 346 | 355 | 336 | 348 | 310 |
| Rep. 2 | 308 | 313 | 352 | 340 | 350 | 353 |
| Rep. 3 | 302 | 330 | 313 | 313 | 319 | 333 |
| Rep. 4 | 336 | 314 | 311 | 330 | 325 | 330 |
| Rep. 5 | 308 | 300 | 318 | 313 | 309 | 329 |
| Average | 323 | 321 | 330 | 326 | 330 | 331 |
| Female—feed conversion | | | | | | |
| Rep. 1 | 1.51 | 1.62 | 1.57 | 1.58 | 1.57 | 1.68 |
| Rep. 2 | 1.63 | 1.62 | 1.63 | 1.66 | 1.56 | 1.63 |
| Rep. 3 | 1.70 | 1.60 | 1.63 | 1.62 | 1.64 | 1.70 |
| Rep. 4 | 1.54 | 1.64 | 1.72 | 1.61 | 1.62 | 1.58 |
| Rep. 5 | 1.72 | 1.76 | 1.54 | 1.66 | 1.65 | 1.60 |
| Average | 1.62 | 1.65 | 1.62 | 1.63 | 1.61 | 1.64 |

TABLE II

[Average weights and feed conversion, twenty-day—post injection]

| | Control | 1 mg. | 3 mg. | 6 mg. | 9 mg. | 12 mg. |
|---|---|---|---|---|---|---|
| Male—weights | | | | | | |
| Rep. 1 | 695 | 587 | 708 | 708 | 697 | 726 |
| Rep. 2 | 704 | 696 | 719 | 689 | 721 | 720 |
| Rep. 3 | 713 | 726 | 701 | 719 | 706 | 703 |
| Rep. 4 | 738 | 686 | 698 | 704 | 727 | 715 |
| Rep. 5 | 712 | 711 | 700 | 703 | 730 | 680 |
| Average | 712 | 681 | 705 | 705 | 716 | 709 |
| Male—feed conversion | | | | | | |
| Rep. 1 | 1.84 | 1.78 | 1.70 | 1.75 | 1.59 | 1.70 |
| Rep. 2 | 1.65 | 1.67 | 1.66 | 1.69 | 1.74 | 1.70 |
| Rep. 3 | 1.66 | 1.69 | 1.72 | 1.75 | 1.69 | 1.69 |
| Rep. 4 | 1.67 | 1.68 | 1.71 | 1.69 | 1.72 | 1.68 |
| Rep. 5 | 1.66 | 1.67 | 1.66 | 1.72 | 1.64 | 1.68 |
| Average | 1.70 | 1.70 | 1.69 | 1.72 | 1.68 | 1.69 |
| Female—weights | | | | | | |
| Rep. 1 | 632 | 626 | 623 | 618 | 619 | 557 |
| Rep. 2 | 519 | 550 | 633 | 618 | 619 | 591 |
| Rep. 3 | 515 | 593 | 551 | 543 | 557 | 576 |
| Rep. 4 | 595 | 575 | 549 | 573 | 557 | 560 |
| Rep. 5 | 530 | 553 | 551 | 540 | 539 | 588 |
| Average | 558 | 579 | 581 | 578 | 578 | 574 |
| Female—feed conversion | | | | | | |
| Rep. 1 | 1.71 | 1.77 | 1.77 | 1.77 | 1.80 | 1.82 |
| Rep. 2 | 1.80 | 1.76 | 1.76 | 1.85 | 1.77 | 1.83 |
| Rep. 3 | 1.88 | 1.75 | 1.79 | 1.79 | 1.81 | 1.86 |
| Rep. 4 | 1.76 | 1.79 | 1.86 | 1.80 | 1.79 | 1.79 |
| Rep. 5 | 1.89 | 1.80 | 1.77 | 1.82 | 1.84 | 1.76 |
| Average | 1.83 | 1.77 | 1.79 | 1.81 | 1.80 | 1.81 |

TABLE III

[Average weights and feed conversion, thirty-day—post injection]

| | Control | 1 mg. | 3 mg. | 6 mg. | 9 mg. | 12 mg. |
|---|---|---|---|---|---|---|
| Male—weights | | | | | | |
| Rep. 1 | 1,043 | 964 | 1,070 | 1,033 | 1,095 | 1,096 |
| Rep. 2 | 1,057 | 1,071 | 1,143 | 1,065 | 1,066 | 1,097 |
| Rep. 3 | 1,078 | 1,109 | 1,078 | 1,123 | 1,075 | 1,029 |
| Rep. 4 | 1,129 | 1,131 | 1,063 | 1,071 | 1,156 | 1,108 |
| Rep. 5 | 1,139 | 1,077 | 1,076 | 1,053 | 1,122 | 1,066 |
| Average | 1,089 | 1,070 | 1,086 | 1,069 | 1,103 | 1,079 |

TABLE III—Continued

| | Control | 1 mg. | 3 mg. | 6 mg. | 9 mg. | 12 mg. |
|---|---|---|---|---|---|---|
| Male—feed conversion | | | | | | |
| Rep. 1 | 1.99 | 1.94 | 1.88 | 1.92 | 1.78 | 1.89 |
| Rep. 2 | 1.84 | 1.82 | 1.76 | 1.86 | 1.96 | 1.86 |
| Rep. 3 | 1.85 | 1.84 | 1.85 | 1.91 | 1.87 | 1.91 |
| Rep. 4 | 2.01 | 1.75 | 1.87 | 1.84 | 1.81 | 1.84 |
| Rep. 5 | 1.82 | 1.86 | 1.89 | 1.89 | 1.78 | 1.84 |
| Average | 1.90 | 1.84 | 1.85 | 1.88 | 1.84 | 1.87 |
| Female—weights | | | | | | |
| Rep. 1 | 943 | 933 | 944 | 963 | 935 | 877 |
| Rep. 2 | 821 | 859 | 966 | 946 | 947 | 914 |
| Rep. 3 | 846 | 927 | 905 | 858 | 864 | 901 |
| Rep. 4 | 932 | 927 | 871 | 897 | 865 | 887 |
| Rep. 5 | 838 | 880 | 879 | 856 | 861 | 907 |
| Average | 876 | 905 | 913 | 904 | 894 | 897 |
| Female—feed conversion | | | | | | |
| Rep. 1 | 1.91 | 1.94 | 1.92 | 1.92 | 1.96 | 2.01 |
| Rep. 2 | 1.90 | 1.90 | 1.92 | 2.00 | 1.94 | 1.93 |
| Rep. 3 | 1.93 | 1.91 | 1.92 | 1.98 | 1.95 | 2.00 |
| Rep. 4 | 1.91 | 1.92 | 1.95 | 1.93 | 1.94 | 1.91 |
| Rep. 5 | 1.86 | 1.93 | 1.89 | 1.92 | 1.96 | 1.95 |
| Average | 1.90 | 1.92 | 1.92 | 1.95 | 1.95 | 1.96 |

EXAMPLE II

For the raising of broilers, i.e., starting with day-old to four-week-old chicks, a grower feed is prepared for feeding to the chicks for the first four weeks and a finisher feed is prepared for feeding the four-week-old chicks for the last five weeks until they reach market weight of two and a half to three pounds dressed. For each pound of weight gain, the chicks eat about 1.5 to 2 pounds of feed. Thus, they eat about 1.5 pounds of feed during the first four weeks and about five pounds during the next five weeks. The grower and finisher feeds include, in addition to 10 gm. (0.022 pounds) 3-(p-methoxyphenyl)-4-n-propyl-7-hydroxycoumarin, the following:

| | Grower (lbs.) | Finisher (lbs.) |
|---|---|---|
| Ground yellow corn | 1,000 | 1,200 |
| Soybean meal (44% protein) | 700 | 500 |
| Fish meal (60% protein) | 100 | 80 |
| Alfalfa meal | 50 | 50 |
| Meat and bone scraps | 0 | 30 |
| Animal fat | 80 | 80 |
| Dicalcium phosphate | 35 | 40 |
| Iodized salt | 10 | 10 |
| Limestone | 15 | |
| Premix vitamins trace minerals and antibiotics | 10 | 10 |

EXAMPLE III

Two groups of turkey poults are placed in separate pens and fed the identical commercial feed of the following composition, wherein the indicated amounts are percent by weight:

| | Percent |
|---|---|
| Corn meal, yellow | 38.95 |
| Soybean oil meal dehulled | 32.00 |
| Alfalfa meal, dehydrated | 2.00 |
| Fish meal | 5.00 |
| Whey (dried) | 2.00 |
| Brewers' yeast | 3.00 |
| Liver meal | 2.00 |
| Meat and bone meal | 4.00 |
| Prime beef tallow | 5.00 |
| Calcite flour | 2.00 |
| Dicalcium phosphate | 2.00 |
| Choline chloride | 0.02 |
| Vitamin $D_3$ supplement (3000 ICU/gram) | 0.08 |
| Vitamin A supplement (5000 USP units/gram) | 0.40 |
| Iodized salt | 0.45 |
| Manganese sulfate | 0.05 |
| Ca-methionine hydroxy analog | 0.05 |
| Vitamin premix | 1.00 |
| | 100.00 |

One part of the vitamin premix contains the following ingredients in such amount as to provide the following concentration in the final feed:

| | Percent |
|---|---|
| Niacin | 0.004 |
| Calcium pentothenate | 0.002 |
| Riboflavin | 0.0005 |
| Folic acid | 0.0001 |
| Vitamin $B_{12}$ | 0.000002 |

Each group of these turkeys is maintained on this identical basal diet until reaching commercial sale weight. The premix has incorporated with its feed about 50 gms./ton feed (about 0.005%) of the compound of Formula 1 based on the total weight of the feed to improve rate of weight gain.

EXAMPLE IV

Three concentrate compositions are made by admixing respectively (1) 5.0 gm., (2) 25 gm., and (3) 50 gm. of the compound of Formula 1 with ground corn to make, in each case, a total concentrate mix of 250 grams.

A basal diet is prepared of the following ingredients, wherein the figures given are percent by weight:

| | Percent |
|---|---|
| Yellow corn | 47.52 |
| Soybean meal (dehulled, 50%) | 28.80 |
| Fat | 10.05 |
| Alfalfa meal | 2.00 |
| Fish meal | 4.00 |
| Dried whey | 2.00 |
| Corn distillers' solubles | 2.00 |
| Calcite flour | 1.00 |
| Dicalcium phosphate | 1.25 |
| Iodized salt | 0.25 |
| Manganese sulfate | 0.03 |
| Vitamin supplement | 1.00 |
| Ca-methionine hydroxy analog | 0.10 |
| | 100.00 |

The vitamin supplement provides the following in milligrams per one hundred grams of diet:

| | |
|---|---|
| Alpha-tocopherol | 0.25 |
| Niacin | 2.00 |
| D-calcium pantothenate | 1.00 |
| Riboflavin | 0.25 |
| Folic acid | 0.05 |
| Menadione | 0.05 |
| Vitamin $B_{12}$ | 0.0011 |
| Choline chloride | 50.00 |
| Vitamin $D_3$ supplement (3000 ICU/gram) | 50.00 |
| Vitamin A supplement (5000 USP units/gram) | 100.00 |

A coccidiostat can be added to the above as required.

Concentrates (1), (2) and (3) are admixed in suitable amounts with three separate portions of the basal diet to provide feeds containing respectively 0.002% and 0.01% and 0.02% by weight of the compound of Formula 1.

Eight groups each containing 48 male and 48 female four-week old cross-bred chicks are used. Two groups are given the feed containing 0.002%, two groups containing 0.01% and two other groups containing 0.02% of the compound until they are broiler size.

EXAMPLE V

Cross-bred Kentucky lambs are randomly allotted to treatment on the basis of sex, weight and pretest performance. A control group and a test group, each containing 6 ewes and 8 wethers are obtained. The test group is fed 4.8 grams of the compound of Formula 1 per ton of feed.

Weight gain and feed efficiency data are recorded and analyzed for the six-week test period. The test results are:

|  | Weight gain | | | F/G | | | |
| --- | --- | --- | --- | --- | --- | --- | --- |
|  | 0-2 week | 0-4 week | 0-6 week | 0-2 week | 0-4 week | 0-6 week | (*) |
| Test group | .57 | .58 | .55 | 4.40 | 4.50 | 4.98 | (18.1) |
| Control | .58 | .48 | .48 | 4.67 | 5.70 | 5.88 | |

* 0-6 weeks percent response as compared to control.

The test results show an 18.1% increase in feed efficiency (feed consumed/weight gain) when the compound is used in the feed as compared to the control. The weight gain in percent of response compared to control was 23.0% ewes, 6.4% altered males and 12.6% both sexes.

|  | LB. |
| --- | --- |
| Finely ground corn cobs | 715 |
| Ground corn | 330 |
| Alfalfa meal | 300 |
| Dried molasses, 85% | 120 |
| Soybean meal, 44% | 300 |
| Dicalcium phosphate | 14 |
| TM salt | 10 |
| Premix [1] | 214 |
|  | 2003 |

[1] Premix:

|  | Lb. |
| --- | --- |
| Ground corn | 202 |
| Limestone | 4 |
| Corn oil | 2 |
| Vitamin E (20,000 IU/lb.) | 1 |
| Baciferm 40 | 1 |

|  | Gm. |
| --- | --- |
| Vitamin A (30,000 IU/gm.) | 100 |
| Vitamin D₃ (200,000 IU/gm.) | 2 |
| BY-24 (Riboflavin) | 38 |
| Calcium pantothenate | 22.2 |
| Niacin | 38 |
| Proferm (Vitamin B₁₂) | 188.8 |

EXAMPLE VI

The compound of Formula 1 is fed to cattle, swine and sheep in the manner described in Example V.

EXAMPLE VII

Day-old Vantress Arbor Acres cross boiler chicks are obtained from a commercial hatchery, weighed in groups of thirty-three, allocated by sex to pens, and started on basal ration. At two weeks of age, all birds are wing-banded and measurement of feed consumption started. At four weeks of age, the birds are randomized according to weight and sex and the pens depopulated to twenty-five in number. Basal ration is fed to all pens except those where treatment is administered orally and then the proper amount of the compound of Formula 1 on a per ton basis is mixed in the feed as indicated. At the time the treatment is instituted, each bird in the approriate pen receives the proper amount of compound suspended in ½ cc. of paste implant material and those birds on medicated feed and controls are given a placebo paste implant of the same volume. Measurement of feed consumption is started at this time. At ten-day intervals the chicks are weighed individually, according to number, and feed consumption is measured for the period. Two groups of birds are used for each amount of compound and control. At termination, all birds are individually weighed and weigh back of the feed is determined. The basal ration is:

|  | Lb. |
| --- | --- |
| Ground yellow corn | 1000 |
| Soybean meal, 44% | 700 |
| Fish meal, 60% | 100 |
| Alfalfa meal | 50 |
| Animal fat | 80 |
| Dicalcium phosphate | 35 |
| Limestone | 15 |
| Iodized salt | 10 |

|  | Gm. |
| --- | --- |
| Trace mineral mix—CSC | 454 |
| Choline supplement, 25% | 2000 |
| DL methionine | 908 |
| Proferm 24 | 227 |
| Manganese sulfate | 167 |
| Vitamin A (30,000 IU/gm.) | 200 |
| Vitamin D₃ (200,000 IU/gm.) | 12 |
| Santoquin | 113 |
| BY-24 | 120 |
| Niacin, 98% | 40 |
| Calcium pantothenate | 36 |
| Vitamin K (Menadione), 32% | 4 |
| Vitamin E (Myvamix) | 113 |
| Zinc oxide | 45 |
| Zoamix | 454 |

Weight gain and feed efficiency data is given in the tables below. The test results show that administration of the compound gives a response particularly with female chicks.

AVERAGE WEIGHT GAIN, 10-20-30-DAY DATA

| Treatment | Control | 1 mg. | 3 mg. | 6 mg. | 9 mg. | 12 mg. | 25 gm./ T feed | 50 gm./ T feed |
| --- | --- | --- | --- | --- | --- | --- | --- | --- |
| Male—10-day | | | | | | | | |
| Rep. 1 | 1,137 | 1,119 | 1,149 | 1,133 | 1,151 | 1,114 | 1,129 | 1,121 |
| Rep. 2 | 1,127 | 1,117 | 1,113 | 1,136 | 1,131 | 1,119 | 1,141 | |
| Average | 1,132 | 1,118 | 1,131 | 1,135 | 1,141 | 1,117 | 1,135 | 1,121 |
| Female—10-day | | | | | | | | |
| Rep. 1 | 914 | 936 | 922 | 928 | 937 | 921 | 938 | 937 |
| Rep. 2 | 935 | 917 | 919 | 927 | 931 | 932 | 922 | |
| Average | 925 | 926 | 921 | 928 | 934 | 927 | 930 | 937 |
| Male—20-day | | | | | | | | |
| Rep. 1 | 1,603 | 1,579 | 1,592 | 1,580 | 1,606 | 1,560 | 1,586 | 1,576 |
| Rep. 2 | 1,569 | 1,562 | 1,566 | 1,573 | 1,557 | 1,550 | 1,610 | |
| Average | 1,586 | 1,571 | 1,579 | 1,57 | 1,581 | 1,555 | 1,598 | 1,576 |
| Female—20-day | | | | | | | | |
| Rep. 1 | 1,259 | 1,273 | 1,267 | 1,266 | 1,278 | 1,278 | 1,293 | 1,301 |
| Rep. 2 | 1,278 | 1,266 | 1,262 | 1,269 | 1,263 | 1,267 | 1,268 | |
| Average | 1,268 | 1,270 | 1,265 | 1,268 | 1,271 | 1,272 | 1,281 | 1,301 |
| Male—30-day | | | | | | | | |
| Rep. 1 | 2,119 | 2,104 | 2,181 | 2,125 | 2,122 | 2,057 | 2,104 | 2,105 |
| Rep. 2 | 2,131 | 2,103 | 2,098 | 2,096 | 2,117 | 2,086 | 2,136 | |
| Average | 2,125 | 2,105 | 2,140 | 2,111 | 2,120 | 2,072 | 2,120 | 2,105 |

AVERAGE WEIGHT GAIN, 10-, 20-, 30-DAY DATA — Continued

| Treatment | Control | 1 mg. | 3 mg. | 6 mg. | 9 mg. | 12 mg. | 25 gm./ T feed | 50 gm./ T feed |
|---|---|---|---|---|---|---|---|---|
| Female—30-day | | | | | | | | |
| Rep. 1 | 1,653 | 1,648 | 1,679 | 1,649 | 1,765 | 1,649 | 1,677 | 1,706 |
| Rep. 2 | 1,622 | 1,683 | 1,660 | 1,674 | 1,664 | 1,661 | 1,631 | |
| Average | 1,638 | 1,666 | 1,670 | 1,661 | 1,665 | 1,655 | 1,654 | 1,706 |

FEED CONVERSION, 10- 20- 30-DAY DATA

| Treatment | Control | 1 mg. | 3 mg. | 6 mg. | 9 mg. | 12 mg. | 25 gm./ T feed | 50 gm./ T feed |
|---|---|---|---|---|---|---|---|---|
| Male—10-day | | | | | | | | |
| Rep. 1 | 1.71 | 1.77 | 1.71 | 1.66 | 1.44 | 1.77 | 1.74 | 1.72 |
| Rep. 2 | 1.73 | 1.74 | 1.78 | 1.70 | 1.75 | 1.74 | 9.69 | |
| Average | 1.72 | 1.76 | 1.75 | 1.68 | 1.60 | 1.76 | 1.72 | 1.72 |
| Female—10-day | | | | | | | | |
| Rep. 1 | 1.83 | 1.76 | 1.82 | 1.80 | 1.80 | 1.83 | 1.78 | 1.85 |
| Rep. 2 | 1.80 | 1.86 | 1.89 | 1.82 | 1.79 | 1.77 | 1.76 | |
| Average | 1.82 | 1.81 | 1.86 | 1.81 | 1.80 | 1.80 | 1.77 | 1.85 |
| Male—20-day | | | | | | | | |
| Rep. 1 | 2.01 | 2.06 | 2.09 | 1.96 | 1.82 | 2.07 | 2.03 | 2.02 |
| Rep. 2 | 2.02 | 2.04 | 2.06 | 2.04 | 2.17 | 2.06 | 2.01 | |
| Average | 2.02 | 2.05 | 2.08 | 2.00 | 2.00 | 2.07 | 2.20 | 2.02 |
| Female—20-day | | | | | | | | |
| Rep. 1 | 2.11 | 2.07 | 2.07 | 2.11 | 2.12 | 2.11 | 2.07 | 2.10 |
| Rep. 2 | 2.13 | 2.12 | 2.16 | 2.13 | 2.12 | 2.11 | 2.07 | |
| Average | 2.12 | 2.09 | 2.12 | 2.12 | 2.12 | 2.11 | 2.07 | 2.10 |
| Male—30-day | | | | | | | | |
| Rep. 1 | 2.25 | 2.24 | 2.18 | 2.15 | 2.10 | 2.28 | 2.24 | 2.25 |
| Rep. 2 | 2.20 | 2.21 | 2.27 | 2.28 | 2.36 | 2.27 | 2.26 | |
| Average | 2.23 | 2.23 | 2.23 | 2.22 | 2.23 | 2.28 | 2.25 | 2.25 |
| Female—30-day | | | | | | | | |
| Rep. 1 | 2.34 | 2.29 | 2.31 | 2.33 | 2.24 | 2.38 | 2.31 | 2.32 |
| Rep. 2 | 2.39 | 2.31 | 2.40 | 2.36 | 2.35 | 2.38 | 2.33 | |
| Average | 2.36 | 2.30 | 2.36 | 2.35 | 2.35 | 2.38 | 2.32 | 2.32 |

EXAMPLES VIII TO XII

The compound 3 - (p-hydroxyphenyl)-4-n-propyl-7-hydroxycoumarin instead of the compound of Formula 1 is employed in the same amounts and in the same manner set forth in Examples II, III, IV, V and VI.

EXAMPLES XIII TO XVII

The compound 3 - (p - benzyloxyphenyl)-4-n-propyl-7-hydroxycoumarin instead of the compound of Formula 1 is employed in the same amounts and in the same manner set forth in Examples II, III, IV, V and VI.

The coumarin compounds employed in the present invention are known and can be prepared, for instance, in accordance with a procedure described in Bulletin of the Societe Chimique of France, 1946, pp. 271–276 by Mentzer et al. (vol. 13). For instance, p-methoxyphenylacetonitrile can be used to prepare the compound of Formula 1; p-hydroxyphenylacetonitrile can be used to prepare 3-(p - hydroxyphenyl)-4-n-propyl-7-hydroxycoumarin; and p-benzyloxyphenylacetonitrile can be used to prepare 3-(p-benzyloxyphenyl)-4-n-propyl-7-hydroxycoumarin.

The foregoing detailed description has been given for clearness of understanding only and no unnecessary limitations are to be understood therefrom.

The invention claimed is:

1. A poultry feed composition comprising a poultry fed and sufficient amounts of one of the following compounds to provide improved weight gain in the animal consuming the feed:

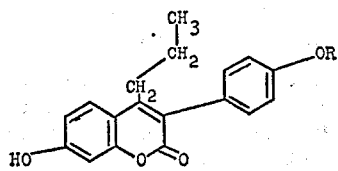

wherein R is hydrogen, lower alkyl or benzyl.

2. The composition of claim 1 wherein the amount is from about 1 to 150 grams of compound per ton feed.

3. A method of improving the rate of growth of poultry comprising feeding to the poultry one of the compositions of claim 1 in an amount effective to improve the rate of weight gain of the poultry.

4. A ruminant feed composition comprising a ruminant feed and sufficient amounts of one of the following compounds to provide improved weight gain in the animal consuming the feed:

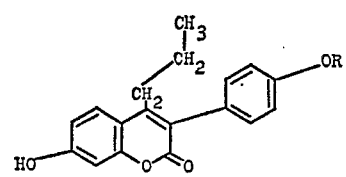

wherein R is hydrogen, lower alkyl or benzyl.

5. The composition of claim 4 wherein the amount is from about 1 to 150 grams compound per ton feed.

6. A method of improving the rate of growth of ruminants comprising feeding to the ruminants one of the compositions of claim 4 in an amount effective to improve the rate of weight gain of the ruminants.

7. A swine feed composition comprising a swine feed and sufficient amounts of one of the following compounds to provide improved weight gain in the animal consuming the feed:

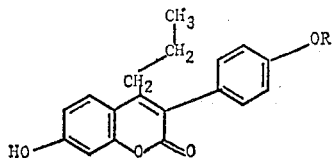

where R is hydrogen, lower alkyl or benzyl.

8. The composition of claim 7 wherein the amount is from about 1 to 150 grams compound per ton feed.

9. A method of improving the rate of growth of swine comprising feeding to the swine one of the compositions of claim 7 in an amount effective to improve the rate of weight gain of the swine.

10. A method of increasing the rate of growth of meat-producing animals comprising administering orally or parenterally to the animal one of the compounds 3-(p-lower alkoxyphenyl) - 4 - n - propyl-7-hydroxycoumarin, 3 - (p - hydroxyphenyl) - 4 - n - propyl - 7 - hydroxycoumarin or 3 - (p - benzyloxyphenyl)-4-n-propyl-7-hydroxycoumarin in an amount and for a time effective to increase the rate of growth, said amount being from about 0.0001% to about 0.02% by weight based upon the total weight of the animal's feed.

11. A poultry feed composition comprising a poultry feed and sufficient amounts of the following compound to provide improved weight gain in the animal consuming the feed:

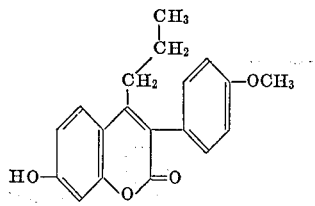

12. The composition of claim 11 wherein the amount is from about 1 to 150 grams of compound per ton feed.

13. A method of improving the rate of growth of poultry comprising feeding to the poultry the composition of claim 11 in an amount effective to improve the rate of weight gain of the poultry.

14. A ruminant feed composition comprising a ruminant feed and sufficient amounts of the following compound to provide improved weight gain in the animal consuming the feed:

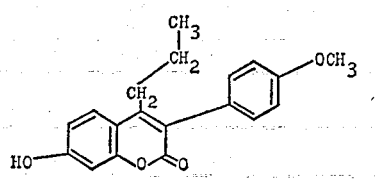

15. The composition of claim 14 wherein the amount is from about 1 to 150 grams compound per ton feed.

16. A method of improving the rate of growth of ruminants comprising feeding to the ruminants the compositon of claim 14 in an amount effective to improve the rate of weight gain of the ruminants.

17. A swine fed composition comprising a swine feed and sufficient amounts of the following compound to provide improved weight gain in the animal consuming the feed:

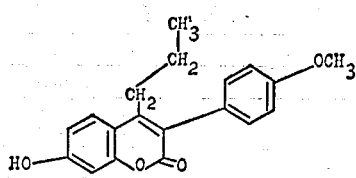

18. The composition of claim 17 wherein the amount is from about 1 to 150 grams compound per ton feed.

19. A method of improving the rate of growth of swine comprising feeding to the swine the composition of claim 17 in an amount effective to improve the rate of weight gain of the swine.

20. A method of increasing the rate of growth of meat-producing animals comprising administering orally or parenterally to the animal the compound 3-(p-methoxyphenyl) - 4 - n - propyl - 7 - hydroxycoumarin in an amount and for a time effective to increase the rate of growth, said amount being from about 0.0001% to about 0.02% by weight based upon the total weight of the animal's feed.

References Cited

Pasault, Chem. Abst. vol. 42 (1948), p. 4409 (4410a).

SAM ROSEN, Primary Examiner